Patented Feb. 21, 1933

1,898,093

UNITED STATES PATENT OFFICE

FREDERICK W. MILLER, JR., OF WILMINGTON, DELAWARE, ASSIGNOR TO E. I. DU PONT DE NEMOURS & COMPANY, OF WILMINGTON, DELAWARE, A CORPORATION OF DELAWARE

UREA MANUFACTURE

No Drawing.  Application filed March 31, 1931.  Serial No. 526,769.

This invention relates to the synthesis of urea from ammonia and carbon dioxide and more particularly to an improved method for the efficient recovery and reutilization of unconverted raw materials.

It is known that when ammonia and carbon dioxide or their compounds (i. e. ammonium carbamate, carbonate, bicarbonate, or mixtures thereof) are heated together in a closed system urea is formed. The conversion to urea is only partial, however, for while various means have been proposed for improving the efficiency of the reaction, in no case is the theoretical conversion attained. The disposition of the unconverted raw materials has an important bearing upon the ultimate cost of the urea. Various proposals have, therefore, previously been made to develop the self-contained urea process in which the unconverted reactants might be separated from the urea and returned to the synthesis for conversion with fresh portions of reactants.

U. S. Patent 1,429,483, for example, proposes that the unconverted ammonia and carbon dioxide obtained by distilling the equilibrium melt, be returned to the synthesis unit by recompression of the mixture, the latter being maintained in a heated condition to prevent clogging of conduits and compressor by solid ammonium carbamate, which would otherwise be deposited. The power requirement for this recompression is high, and serious mechanical difficulties are encountered due to the extremely corrosive nature of a moist mixture of ammonia and carbon dioxide when hot.

U. S. Patent 1,453,069 describes a method of handling the recovered gases to avoid the costly recompression. Briefly, the method involves the absorption of the gases in water and the conveyance of the resulting solution to a "boiler" from which the gases are expelled to the urea autoclave by means of heat. This method requires an uneconomical expenditure of heat in dissociating and expelling the gases from the "boiler".

U. S. Patent 1,730,208 describes a method in which the unconverted ammonia and carbon dioxide are separated from each other following their distillation from the urea equilibrium melt. The gases may then be separately compressed to liquefaction and returned by pumps to the synthesis unit. While this method avoids many of the technical difficulties of other methods, the separation of the two gases is a relatively costly operation.

In German Patent 350,051 distillation temperatures of 160-200° C. are used and the condenser is maintained as low as 120° C. Experience has shown that operation by this procedure would necessarily involve considerable decomposition of urea as well as clogging of the condenser with solid ammonium carbamate, the melting point of which is 152° C.

With a view to overcoming the practical difficulties inherent in the foregoing and other processes of the prior art, it is an object of the present invention to provide an improved process for the synthesis of urea from ammonia and carbon dioxide or compounds thereof in which the unconverted ammonium carbamate is recovered and returned to the synthesis for further conversion.

Other objects and advantages of the invention will be apparent from the following specification in which the preferred embodiments are described.

According to the present invention the urea synthesis is effected by introducing into a suitable closed reaction vessel ammonia and carbon dioxide, either as such or combined as ammonium carbamate, ammonium carbonate, or ammonium bicarbonate, an excess of ammonia over the stoichiometrical requirement being employed. The total ammonia in the synthesis melt is preferably at least 5-6 mols per mol of carbon dioxide. The raw materials are submitted to the combined effect of urea-forming temperatures, e. g. from 140 to 200° C., and the autogenously developed pressure. When equilibrium has been established the synthesis melt is subjected to distillation for the recovery of the unconverted ammonium carbamate. This distillation preferably is accomplished in two steps in the first of which the major part (preferably as much as practicable) of the excess ammonia is recovered at ammonia-liquefying pressure, and in the second of which the balance of the excess ammonia, together with the ammonium carbamate, is distilled at a lower pressure. The gaseous ammonia recovered in the first step is liquefied by cooling and returned to the reaction zone. Ammonium carbamate evolved in the second distillation step is absorbed in water until a relatively concentrated solution of ammonium carbamate (tending to be converted to carbonate or sesquicarbonate) is obtained. This solution is then likewise returned to the reaction zone for further conversion with additional quantities of ammonia and carbon dioxide, or their compounds, an excess of ammonia being maintained in the synthesis melt.

By operating in the foregoing manner ammonium carbamate unconverted in the synthesis autoclave can readily and economically be recovered and reutilized, with an overall efficiency and a reduction in production costs not heretofore possible by the known methods. While the invention is applicable to either batch or continuous processes, the synthesis is preferably effected in a continuous manner and it is with reference to a process of this particular kind that the invention is described in the following example, it being understood that the example is offered only by way of illustration and that the invention is not limited to the example.

*Example.*—The reaction is effected in a corrosion- and pressure-resistant vessel or autoclave such as is ordinarily used in the synthesis of urea, the same being provided with inlets for the raw materials and outlets for withdrawal of the reaction products. Into this autoclave are introduced initially 126 parts by weight of ammonia and 44 parts of carbon dioxide. The charge is heated to about 150° under a pressure of about 100 atmospheres and is maintained under these conditions until little further conversion to urea would take place, this requiring a period of about 2 hours. The synthesis melt is then forced by its own pressure into a primary still in which as the temperature of the melt falls from 150 to 100° substantially all of the excess ammonia is distilled, the distillate being thereafter liquefied, by cooling, and returned to the reaction autoclave. The hot distillation residue, containing the urea, unconverted ammonium carbamate, and a small part of the excess ammonia is transferred to a secondary still where distillation is continued at a temperature of 90–120° C. to remove substantially all of the ammonium carbamate. The ammonia and carbon dioxide thus evolved are absorbed in water. This may be effected in various ways. For example, the hot distillate may be conducted directly into a body of water or the latter may be allowed to flow down a tower or column up which the hot distillate is caused to pass. The temperature of the resulting solution is maintained at about 50° C. and the time of contact of water with gas is adjusted so that a slightly undersaturated solution (about 55% ammonium carbamate) is obtained. This is pumped back to the reaction autoclave.

In a typical operation effected in the foregoing manner the composition of the melt before the primary distillation was approximately,

|  | Per cent |
|---|---|
| Ammonia | 50 |
| Ammonium carbamate | 9.4 |
| Water | 15.3 |
| Urea | 25.3 |

After the primary distillation the composition was—

|  | Per cent |
|---|---|
| Ammonia | 7 |
| Ammonium carbamate | 17.2 |
| Water | 28.5 |
| Urea | 47.3 |

When the cycle has been established the relative proportions of fresh and recirculated materials introduced into the reaction autoclave are approximately as follows, percentages being by weight. Fresh materials: $CO_2$ 18.7%, $NH_3$ 14.5%. Recirculated materials: $CO_2$ 5.2%, $H_2O$ 7.6%, $NH_3$ (as carbamate) 4.0%, $NH_3$ (uncombined) 50%. Under the foregoing conditions the conversion of ammonium carbamate to urea attained in the autoclave is approximately 75% per pass, whereas the overall efficiency of conversion of the cyclical process approaches as near 110% as the tightness of the system will permit.

With reference to the primary distillation of excess ammonia I have found that where cooling water available for the ammonia liquefaction is not sufficiently cold to effect separation of the desired maximum of ammonia the distillation is advantageously conducted in two stages in the first of which substantially all the ammonia is liquefied merely by cooling and in the second compression is employed as an aid to liquefaction.

As previously pointed out herein, the invention is applicable to the synthesis of urea using as raw materials ammonia and carbon dioxide, as such or as compounds thereof. It is understood, therefore, that in the following claims, where reference is made to the synthesis of urea by heating ammonia and carbon dioxide, it is intended to include not only these materials per se but also the equivalent compounds thereof.

Various changes may be made in the method described without departing from

I claim:

1. The process for the synthesis of urea by heating ammonia and carbon dioxide, which includes the steps of recovering unconverted ammonium carbamate from the synthesis melt by distilling the same, absorbing the distillate in water to form a relatively concentrated solution of ammonium carbamate and subjecting said solution together with additional ammonia and carbon dioxide to urea-forming temperature and pressure in the presence of a substantial excess of ammonia.

2. The process for the synthesis of urea by heating ammonia and carbon dioxide, which includes the steps of recovering unconverted ammonium carbamate from the synthesis melt by distilling the same, absorbing the distillate in water to form a relatively concentrated solution of ammonium carbamate, and subjecting said solution together with additional ammonia and carbon dioxide to urea-forming temperature and pressure in the presence of an ammonia content of the melt corresponding to a total of at least five mols of $NH_3$ per mol of $CO_2$ equivalent present.

3. The continuous process for the synthesis of urea which comprises subjecting ammonia and carbon dioxide to urea-forming temperature and pressure while maintaining an excess of free ammonia in the synthesis melt, subjecting the melt to a primary pressure distillation in which at least the major part of the excess ammonia is recovered and thereafter to a secondary distillation at a lower pressure, in which unconverted ammonium carbamate is recovered by absorption in water to form a relatively concentrated solution of ammonium carbamate, and submitting said solution, together with ammonia from the primary distillation and fresh ammonia and carbon dioxide, to urea-forming temperature and pressure.

4. Process as in claim 3 in which the primary distillation is effected in two steps, the ammonia from the first step being liquefied by cooling alone and the ammonia from the second step being liquefied by compressing and cooling.

5. Process as in claim 3 in which an ammonia concentration is maintained in the synthesis melt corresponding to a total of at least five mols of $NH_3$ per mol of $CO_2$.

6. The continuous process for the synthesis of urea which comprises subjecting ammonia and carbon dioxide to urea-forming temperature and pressure while maintaining an excess of free ammonia in the synthesis melt, subjecting the melt to a primary pressure distillation in which at least the major part of the excess ammonia is recovered and thereafter to a secondary distillation at a lower pressure, in which unconverted ammonium carbamate is recovered by absorption in water to form a relatively concentrated solution of ammonium carbamate and submitting said solution, together with ammonia and carbon dioxide, to urea-forming temperature and pressure.

In testimony whereof, I affix my signature.

FREDERICK W. MILLER, Jr.